United States Patent
Englander et al.

(10) Patent No.: US 10,821,898 B1
(45) Date of Patent: Nov. 3, 2020

(54) MIRROR MOUNT WITH LATERAL SUPPORT BRACE AND TRIANGLE MIRROR MOUNT

(71) Applicant: Rosco, Inc., Jamaica, NY (US)

(72) Inventors: Benjamin Englander, Woodmere, NY (US); Julian Serer, Plainview, NY (US); Joe Ippolito, West Windsor, NJ (US)

(73) Assignee: ROSCO, INC., Jamaica, NY (US)

( * ) Notice: Subject to any disclaimer, the term of this patent is extended or adjusted under 35 U.S.C. 154(b) by 851 days.

(21) Appl. No.: 15/088,623

(22) Filed: Apr. 1, 2016

Related U.S. Application Data

(60) Provisional application No. 62/141,913, filed on Apr. 2, 2015.

(51) Int. Cl.
*B60R 1/06* (2006.01)
*B60R 1/08* (2006.01)
*B60R 1/076* (2006.01)

(52) U.S. Cl.
CPC ............. *B60R 1/06* (2013.01); *B60R 1/0605* (2013.01); *B60R 1/076* (2013.01); *B60R 1/082* (2013.01)

(58) Field of Classification Search
CPC ......... B60R 1/06; B60R 1/0605; B60R 1/076; B60R 1/082
USPC ..... 359/841, 850, 872, 900; 248/475.1, 476, 248/479
See application file for complete search history.

(56) References Cited

U.S. PATENT DOCUMENTS

| | | | | |
|---|---|---|---|---|
| 1,719,821 A | * | 7/1929 | Alexander | B60R 1/06 16/223 |
| 1,973,847 A | * | 9/1934 | De Orlow | B60R 1/06 248/482 |
| 2,447,786 A | * | 8/1948 | Anderson, Jr. | B60R 1/06 248/231.71 |
| 2,458,117 A | * | 1/1949 | Tolbert | B60R 1/06 248/213.1 |
| 2,533,867 A | * | 12/1950 | Zink | B60R 1/078 248/276.1 |
| 2,545,777 A | * | 3/1951 | Hardin | B60R 1/078 248/279.1 |
| 2,860,546 A | * | 11/1958 | Bolser | B60R 1/0617 248/279.1 |

(Continued)

*Primary Examiner* — Ricky D Shafer
(74) *Attorney, Agent, or Firm* — Manatt, Phelps & Phillips, LLP

(57) ABSTRACT

Various embodiments for mirror mounting assemblies for supporting one or more mirrors are provided. In addition, various alternative methods of installing the mirror mounting assemblies are also provided. The mirror mounting assemblies provide various fixed support portions configured to support one or more mirror mounting arms, which are preferably movable. In some embodiments, the fixed support portion comprises an upper and lower support member and a lateral support brace each configured to be fixedly connected to the vehicle at a separate location. One or more mirror mounting arms may be attached to the fixed support portion by one or more conjoining mechanisms. In other embodiments, the fixed support portion comprises a metal mounting plate configured to be fixedly connected to the vehicle at existing upper door hinge mounting holes. The mounting plate includes at least one conjoining mechanism for connecting one or more mirror mounting arms thereto.

12 Claims, 12 Drawing Sheets

(56) References Cited

U.S. PATENT DOCUMENTS

| | | | |
|---|---|---|---|
| 4,258,983 A * | 3/1981 | Johnson | B60R 1/0605 |
| | | | 248/486 |
| 7,252,398 B2 | 8/2007 | Englander | |
| 8,132,845 B2 * | 3/2012 | Kinoshita | B60J 5/0425 |
| | | | 248/475.1 |
| 2002/0027186 A1 * | 3/2002 | Lang | B60R 1/0605 |
| | | | 248/475.1 |
| 2003/0116690 A1 * | 6/2003 | Frazier | B60R 1/0617 |
| | | | 248/476 |
| 2006/0187669 A1 | 8/2006 | Englander | |
| 2010/0079883 A1 | 4/2010 | Englander | |

\* cited by examiner

MIRROR MOUNT WITH LATERAL SUPPORT BRACE AND TRIANGLE MIRROR MOUNT

RELATED APPLICATIONS

This application claims the benefit of, and priority to, U.S. Provisional Application No. 62/141,913, entitled "Mirror Mounting Assembly Including Lateral Support Brace Assembly and Method of Installing Same," filed on Apr. 2, 2015, which is incorporated herein by reference in its entirety. This application is related to U.S. application Ser. No. 14/754,888, entitled "Mounting Assembly With Multiple Vehicle Connection Locations and Method of Installing Same," filed Jun. 30, 2015, which claims priority to U.S. Provisional Application No. 62/018,777, entitled "Mirror Mounting Assembly and Method of Installing Mirror Mounting Assembly," filed on Jun. 30, 2014, both of which are also incorporated by reference herein in their entirety.

SUMMARY

Various embodiments for mirror mounting assemblies for supporting one or more mirrors are provided. In addition, various alternative methods of installing the mirror mounting assemblies are also provided.

In some embodiments, the present invention provides a mirror mounting assembly and/or a method of installing mirror mounting assembly having at least one lateral support brace assembly and/or other support brace assembly system.

In some embodiments, a mirror mounting assembly for mounting a mirror to a vehicle comprises a mirror mounting arm including an arm portion and configured to support the mirror, a lower support member including a lower base end portion configured to be connected to the vehicle at a first vehicle location and a lower distal end portion configured to be connected to the mirror mounting arm at a first mount location, an upper support member including an upper base end portion configured to be connected to the vehicle at a second location and an upper distal end portion configured to be connected to the mirror mounting arm at a second mount location, and a lateral support brace including a lateral base end portion configured to be connected to the vehicle at a third vehicle location and a lateral distal end portion configured to be connected to the lower and/or upper support member. The lower distal end portion of the lower support member and the upper distal end portion of the upper support member are configured to extend along a side body panel of the vehicle substantially in conformance with the vehicle. The lower distal end portion of the lower support member and the upper distal end portion of the upper support member are connected to the mirror mounting arm. In some embodiments, the lateral support brace is connected substantially perpendicular to at least a portion of the lower and/or upper support member.

In some embodiments of the mirror mounting assembly, the mirror mounting arm includes a breakaway mechanism. The breakaway mechanism is connected to the lower support member at the first mount location and the upper support member at the second mount location. The arm portion of the mirror mounting arm is optionally hingedly connected to the breakaway mechanism.

In some embodiments, the mirror mounting assembly is configured to mount a rear view mirror. In other embodiments, the mirror mounting assembly is configured to mount a cross view mirror. In other embodiments, the mirror mounting assembly is configured to mount both a rear view and a cross view mirror.

In some embodiments, the main arm assembly and/or mirror mounting assembly is extended to create a pivot closer to the front of the vehicle so the cross view mirror arm can be shorter, and additional lateral bracing is optional. In some embodiments, the rear view mirror pivot has been moved rearward closer to the door with a set of tabs, thereby forming a mirror mounting assembly with multiple pivots and/or pivot mechanisms.

In some embodiments, a similar mirror mounting assembly is mounted on the passenger side of the vehicle with the rear view pivots in a different location based on viewing requirements, i.e., the driver side rear view mirror needs to be viewed through the door and the passenger side rear view needs to be viewed through the windshield by the driver.

In some embodiments, a conjoining mechanism, such as a support bracket and/or a hinge or pivot mechanism, pivotally or rotationally connects to a mirror mounting arm. Each pivot assembly includes, for example, a pair of clamps to receive the mirror mounting arm to form a receiving section that receives a round tube from a mirror mounting arm. In some embodiments, the assembled clamps additionally form an access hole through which cables in heated and/or motorized mirror assemblies may be passed.

In some embodiments of the mirror mounting assembly, the upper base end portion of the upper support member, the lower base end portion of the lower support member and the lateral base end portion of the lateral support brace are configured to be connected to the vehicle in a tripod or other stand configuration. For example, additional support members may be used to create a quad-pod structure and/or other two or more arm support structures.

In some embodiments, the mirror mounting assembly includes two or more lateral support braces. For example, one lateral support brace may, but need not, connect to the vehicle through a hole in the side body panel to a structural location such as an engine block support structure. Additional lateral support braces may connect to alternative structural locations that may, but need not, connect to the vehicle through a panel hole. For example, one or more lateral support braces may route through the hood and/or around the body panel under a level of the hood for connection to a portion of the vehicle below the level of the hood, such as the interior of the body panel and/or engine support and/or a structural portion.

In some embodiments of the mirror mounting assembly, a strut or support is connected to the upper support member and/or the lower support member.

In some embodiments of the mirror mounting assembly, at least one of the base end portions of the support members is connected to a portion of the chassis on which a door hinge member is configured to be placed.

In some embodiments of the mirror mounting assembly, at least one of the base end portions of the support members is connected by means of one or more threaded holes provided on the chassis that are configured to be used for attaching the door hinge members to the chassis.

In some embodiments of the mirror mounting assembly, at least one of the base end portions of the support members is connected to the portion of the chassis through an opening provided on a side fender and/or body panel of the vehicle.

In some embodiments of the mirror mounting assembly, at least one of the base end portions of the support members has a flange having holes which are provided thereon. Each of the holes is located on a position corresponding to the threaded holes provided on the chassis when the flange faces the threaded holes.

In some embodiments of the mirror mounting assembly, at least one of the flanges is configured to be fixed in place to the threaded holes of the chassis by means of screws inserted into both holes provided on the flanges and the chassis.

In some embodiments of the mirror mounting assembly, the distal end portion of the upper support member has a conjoining mechanism, such as a support bracket and/or a hinge or pivot mechanism, and is configured to be connected to the mirror mounting arm using the conjoining mechanism.

In some embodiments of the mirror mounting assembly, the upper support member is integral with or connected to the lower support member and forms a predefined shape comprising substantially, for example, one of a "C" shape, a "V" shape, a "U" shape or a "J" shape and/or other shape.

In some embodiments of the mirror mounting assembly, the upper support member and the lower support member are connected to each other using a weld connection and/or other connection device such as screws, bolts, clamp, adhesive, and any combination thereof.

In some embodiments of the mirror mounting assembly, a support member includes a base end portion and a distal end portion and a conjoining mechanism, such as a hinge or pivot mechanism, includes a support portion and a mirror portion. The base end portion of the support member is configured to be connected to a structural portion of the vehicle, such as a portion of a chassis of the vehicle on which a door hinge member is configured to be placed. The distal end portion is configured to be connected to the support portion of the conjoining mechanism. The mirror portion of the conjoining mechanism is configured to be connected to one or more mirror mounting arms. In alternative embodiments, each of multiple mirror mounting arms has its own conjoining mechanism In some embodiments, at least one of the base end portions of the one or more support members is connected by means of threaded holes provided on the chassis that are configured to be used for attaching through and/or to a side fender, body panel section and/or chassis. In some embodiments, the mirror mounting assembly is used specifically for a Ford transit vehicle, such as the "Ford Transit" body type. In other embodiments, the mirror mounting assembly is used or other body types that accommodate connection locations of reduced vibration and/or a stable connection.

In some embodiments of the mirror mounting assembly, at least one of the base end portions of the one or more support members is connected to the portion of the chassis through an opening provided on a side fender or body panel section of the vehicle for direct connection to the fender or body panel and/or for connection to a different portion of the vehicle, such as the vehicle chassis or other portion of the vehicle that provides a stable support and/or reduced vibration on the assembly and/or the mirror.

In some embodiments, a different number of holes and/or connection devices are used. In some embodiments, a different number of support members and/or shapes of the support members are utilized. In some embodiments, instead of a pivot mechanism, a connection location is used which fixes the mirror mounting arm in one or more predetermined positions.

In some embodiments, a mirror mounting assembly for mounting a first mirror and a second mirror to a vehicle comprises a first mirror mounting arm including an arm portion and configured to support the first mirror; a second mirror mounting arm including an arm portion and configured to support the second mirror; a lower support member including a lower base end portion configured to be connected to the vehicle at a first vehicle location and a lower distal end portion configured to be connected to said first mirror mounting arm and said second mirror mounting arm at a first mount location, and configured to extend along a side body panel of the vehicle substantially in conformance and parallel with the side body panel; an upper support member including an upper base end portion configured to be connected to the vehicle at a second vehicle location and an upper distal end portion configured to be connected to said first mirror mounting arm and said second mirror mounting arm at a second mount location, and configured to extend along a side body panel of the vehicle substantially in conformance and parallel with the side body panel; a first lateral support brace including a lateral base end portion configured to be connected to the vehicle at a third vehicle location and a lateral distal end portion configured to be connected to at least one of said lower and upper support members, and said lateral support brace being connected substantially perpendicular to at least a portion of one of said lower and upper support members; and a second lateral support brace including a lateral base end portion configured to be connected to the vehicle at a fourth vehicle location and a lateral distal end portion configured to be connected to at least one of said first and second mirror mounting arms.

In some embodiments, a mirror mounting assembly for mounting a first mirror and a second mirror to a vehicle comprises a first conjoining mechanism; a first mirror mounting arm including an arm portion, configured to support the first mirror, and configured to be connected to said first conjoining mechanism; a second conjoining mechanism; a second mirror mounting arm including an arm portion, configured to support the second mirror, and configured to be connected to said second conjoining mechanism; a lower support member, including a lower base end portion configured to be connected to the vehicle at a first vehicle location, configured to be connected to said first conjoining mechanism at a first joint location, configured to be connected to said second conjoining mechanism at a second joint location, and configured to extend along a side body panel of the vehicle substantially in conformance and parallel with the side body panel; an upper support member including an upper base end portion configured to be connected to the vehicle at a second vehicle location, configured to be connected to said first conjoining mechanism at a first joint location, configured to be connected to said second conjoining mechanism at a second joint location, and configured to extend along a side body panel of the vehicle substantially in conformance and parallel with the side body panel; a first lateral support brace including a lateral base end portion configured to be connected to the vehicle at a third vehicle location and a lateral distal end portion configured to be connected to at least one of said lower and upper support members, and said lateral support brace being connected substantially perpendicular to at least a portion of one of said lower and upper support members; and a second lateral support brace including a lateral base end portion configured to be connected to the vehicle at a fourth vehicle location and a lateral distal end portion configured to be connected to at least one of said first and second mirror mounting arms.

In some embodiments, each conjoining mechanism includes a pair of clamps that assembles to form a receiving section that receives at least a portion of the first or the second mirror mounting arm. In some embodiments, the assembled clamp pair additionally forms an access hole through which wires may be passed.

In some embodiments, a mirror mounting assembly for mounting a first mirror and a second mirror to a vehicle comprises a first mirror mounting arm including an arm portion, configured to support the first mirror, and configured to be connected to a first conjoining mechanism; a second mirror mounting arm including an arm portion, configured to support the second mirror, and configured to be connected to a second conjoining mechanism; a lower support member, including a lower base end portion configured to be connected to the vehicle at a first vehicle location, configured to be connected to said first conjoining mechanism at a first joint location, configured to be connected to said second conjoining mechanism at a second joint location, and configured to extend along a side body panel of the vehicle substantially in conformance and parallel with the side body panel; an upper support member including an upper base end portion configured to be connected to the vehicle at a second vehicle location, configured to be connected to said first conjoining mechanism at a first joint location, configured to be connected to said second conjoining mechanism at a second joint location, and configured to extend along a side body panel of the vehicle substantially in conformance and parallel with the side body panel; a lateral support brace including a lateral base end portion configured to be connected to the vehicle at a third vehicle location and a lateral distal end portion configured to be connected to at least one of said lower and upper support members, and said lateral support brace being connected substantially perpendicular to at least a portion of one of said lower and upper support members.

In some embodiments, each conjoining mechanism includes a pair of clamps that assembles to form a receiving section that receives at least a portion of the first or the second mirror mounting arm. In some embodiments, the assembled clamp pair additionally forms an access hole through which wires may be passed.

In some embodiments, a mirror mounting assembly for mounting a mirror to a vehicle comprises a mirror mounting arm carrying the mirror; a support member including a base end portion and a distal end portion, the base end portion configured to be connected to the vehicle at a first vehicle location comprising a portion of a chassis of the vehicle on which a door hinge member is configured to be placed; a conjoining mechanism configured to be connected to the distal end portion of said support member and configured to be connected to the mirror mounting arm; and a lateral support brace including a lateral base end portion configured to be connected to the vehicle at a second vehicle location and a lateral distal end portion configured to be connected to at least one of said support member, said conjoining mechanism and said mirror mounting arm.

In some embodiments, the distal end portion of the support member is configured to extend along a side body panel of the vehicle substantially in conformance and parallel with the side body panel. In some embodiments, the mirror mounting assembly of claim 13, further comprises a cross view mirror mounting arm configured to carry a cross view mirror; wherein said conjoining mechanism is configured to be connected to the mirror mounting arm and the cross view mirror mounting arm. In some embodiments, the lateral support brace and the support member form an angle of 90°±10°.

In some embodiments, the present invention comprises a method of installing a mirror mounting assembly on a vehicle, comprising: connecting a mirror to a mirror mounting arm; connecting the mirror mounting arm to a conjoining mechanism; connecting the conjoining mechanism to a support member; connecting the support member to a portion of a chassis of the vehicle on which a door hinge member is configured to be placed; and connecting a lateral support brace including a base end portion to the vehicle at a second vehicle location and a distal end portion to said support member.

In some embodiments, the support member includes a base end portion and a distal end portion, and the method further comprises: connecting the base end portion of the support member to the portion of the chassis by means of threaded holes provided on the chassis that are configured to be used for attaching the door hinge member to the chassis, and connecting the distal end portion of the support member to the conjoining mechanism.

In some embodiments, the method further comprises connecting the base end portion of the support member to the portion of the chassis by means of threaded holes provided on the chassis that are configured to be used for attaching a side fender to the chassis. In some embodiments, the method further comprises connecting the base end portion of the support member to the portion of the chassis through an opening provided on a side fender of the vehicle. In some embodiments, the conjoining mechanism includes a support portion configured to be connected to the distal end portion of the support member and a mirror portion, and the method further comprises connecting a cross view mirror mounting arm, including an arm portion and configured to carry a cross view mirror, to the mirror portion of the conjoining mechanism; wherein the mirror portion of the conjoining mechanism is configured to be connected to the mirror mounting arm and the cross view mirror mounting arm.

In some embodiments, a mirror mounting assembly for mounting one or more mirrors to a vehicle comprises at least one mirror mounting arm configured to be connected to a mirror; a support member including a base end portion configured to be connected to the vehicle at a first vehicle location and a distal end portion configured to be connected to said at least one mirror mounting arm, the base end portion configured to be connected to a portion of a chassis of the vehicle on which a door hinge member is configured to be placed; and a lateral support brace including a lateral base end portion configured to be connected to the vehicle at a second vehicle location and a lateral distal end portion configured to be connected to the support member and substantially perpendicular to a side body panel of the vehicle. In some embodiments, the mirror mounting assembly further comprises two or more mirror mounting arms each configured to be connected to the support member at a substantially same location.

In some embodiments, a mirror mounting assembly for mounting a mirror to a vehicle comprises a cast aluminum mounting plate configured to be fixedly connected to a portion of a chassis of the vehicle on which a door hinge member is configured to be placed, said mounting plate including a mirror attachment portion for attaching a mirror mounting arm thereto, and at least one screw hole therein for connecting the mounting plate to the vehicle via a screw. In some embodiments, the mirror attachment portion comprises a hinge mechanism and the mirror mounting arm is hingedly connected to the mounting plate.

In some embodiments, the mounting plate comprises reinforcement around the at least one screw hole. In some embodiments, the mounting plate comprises three screw holes therein for connecting the mounting plate to the vehicle; and the mounting plate comprises reinforcement around and between the three screw holes.

In some embodiments, a mirror mounting assembly for mounting a mirror to a vehicle comprises a mirror mounting arm including an arm portion and configured to support the mirror; a first support member configured to be connected to the vehicle at a first vehicle location and to said mirror mounting arm at a first mount location, and configured to extend along a side body panel of the vehicle substantially in conformance and parallel with the side body panel; a second support member configured to be connected to the vehicle at a second vehicle location, and configured to at least one of be connected to said mirror mounting arm at a second mount location and be connected to said first support member, and configured to extend along a side body panel of the vehicle substantially in conformance and parallel with the side body panel; and a lateral support brace including a lateral base end portion configured to be connected to the vehicle at a third vehicle location and a lateral distal end portion configured to be connected to at least one of said first and second support members, and said lateral distal end portion being connected substantially perpendicular to at least a portion of one of said first and second support members.

Additional, alternative and/or optional features and advantages are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

The foregoing summary, as well as the following detailed description of preferred embodiments of the assembly, will be better understood when read in conjunction with the appended drawings. For the purposes of illustrating certain aspects of the present invention, there are shown in the drawings preferred embodiments. It should be understood, however, that the assembly is not limited to the precise arrangement, structures, features, embodiments, aspects, and methods shown, and the arrangements, structures, features, embodiments, aspects and methods shown may be used singularly or in combination with other arrangements, structures, features, embodiments, aspects and methods.

The drawings are not necessarily drawn to scale and are not in any way intended to limit the scope of the invention, but merely to clarify various exemplary embodiments of the invention. In the drawings.

DETAILED DESCRIPTION

Figure 1:
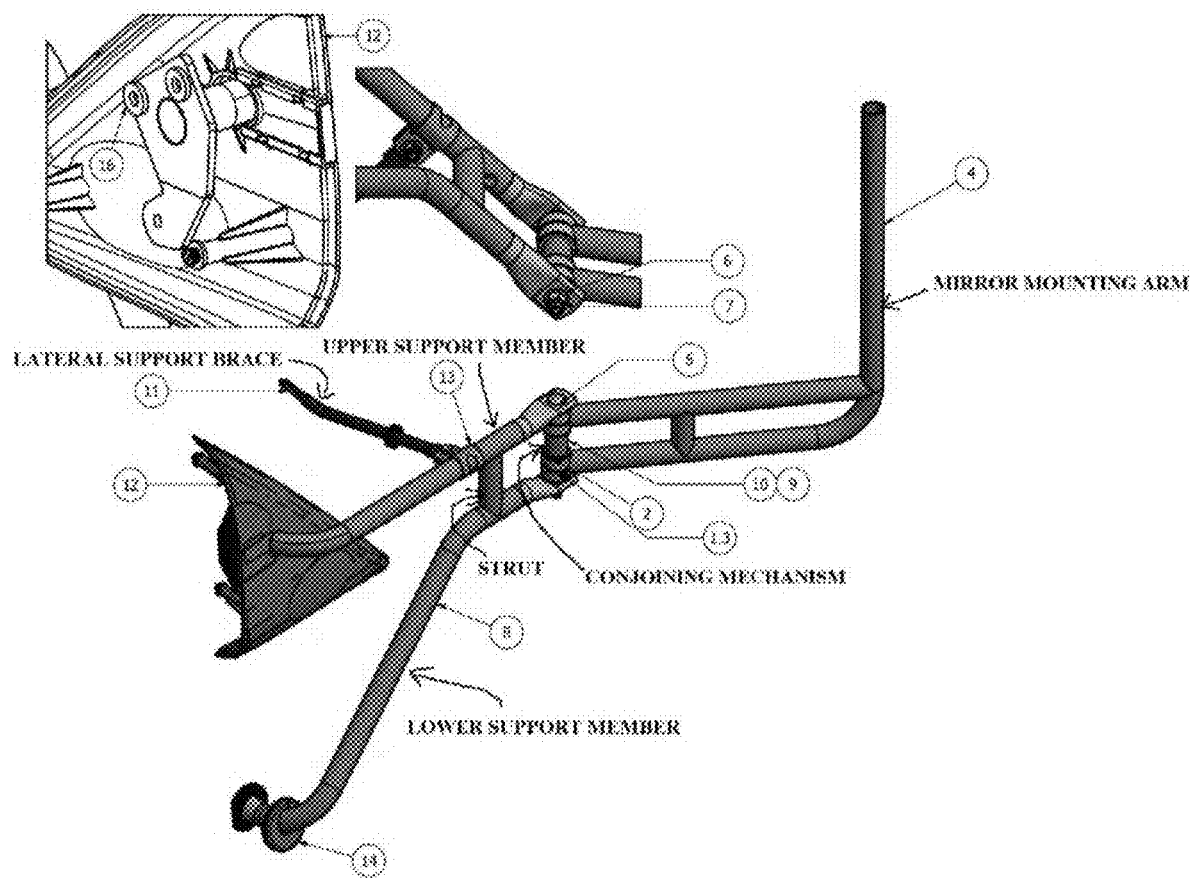
FIG. 1 is a diagram illustrating a mirror mounting assembly according to some embodiments of the present invention.
Figure 2:
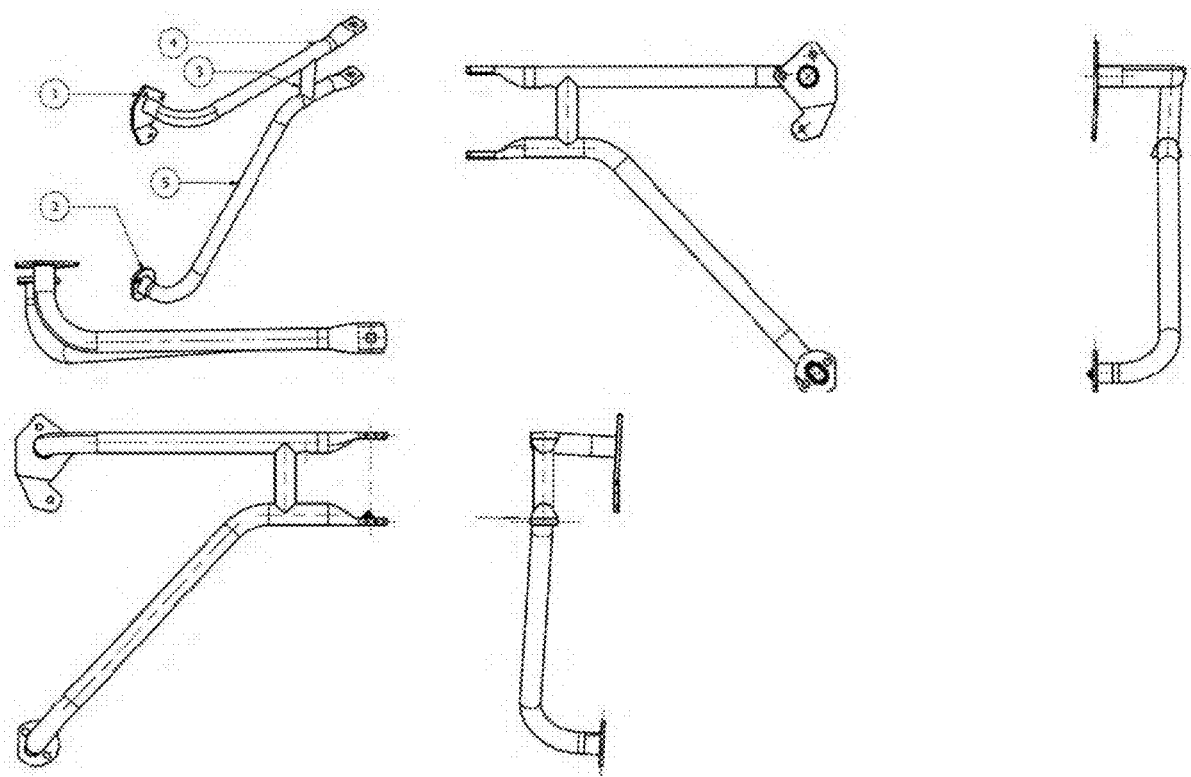
FIG. 2 is a diagram illustrating an upper support member, a lower support member and a strut or support according to some embodiments of the present invention.

FIGS. 1-2 illustrate a mirror mounting assembly according to some embodiments of the present invention. Some of the drawings illustrate sectional compositions and/or partial sectional compositions of some embodiments of the present invention.

FIG. 1 illustrates several views of a mirror mounting assembly in assembled form according to some embodiments of the present invention, including an inset showing the back side of the cover assembly. Table 1 lists the exemplary parts labeled in FIG. 1. In some embodiments, the tubular portion of the conjoining mechanism may comprise, for example, a weather-resistant EPDM (ethylene-propylene-diene monomer) foam tube.

TABLE 1

| Item | Quantity | Description |
| --- | --- | --- |
| 1.3 | 1 | CLAMP HALF |
| 2 | 1 | FLAT WASHER |
| 4 | 1 | MIRROR MOUNTING ARM |
| 5 | 1 | ROUND READ SQUARE NECK BOLT |
| 6 | 1 | FLAT WASHER |
| 7 | 1 | NUT, HEX, NYLON LOCK |
| 8 | 1 | LOWER MOUNTING ARM ASSEMBLY |
| 9 | 1 | TUBE |
| 10 | 1 | SPACER |
| 11 | 1 | RH BRACE ASSEMBLY |
| 12 | 1 | RH COVER ASSEMBLY |
| 13 | 1 | CLAMP |
| 14 | 1 | RUBBER ROUND PLUG |

Figure 7:
FIG. 7 is a diagram illustrating an upper support member and a lateral support brace according to some embodiments of the present invention.
Figure 8:
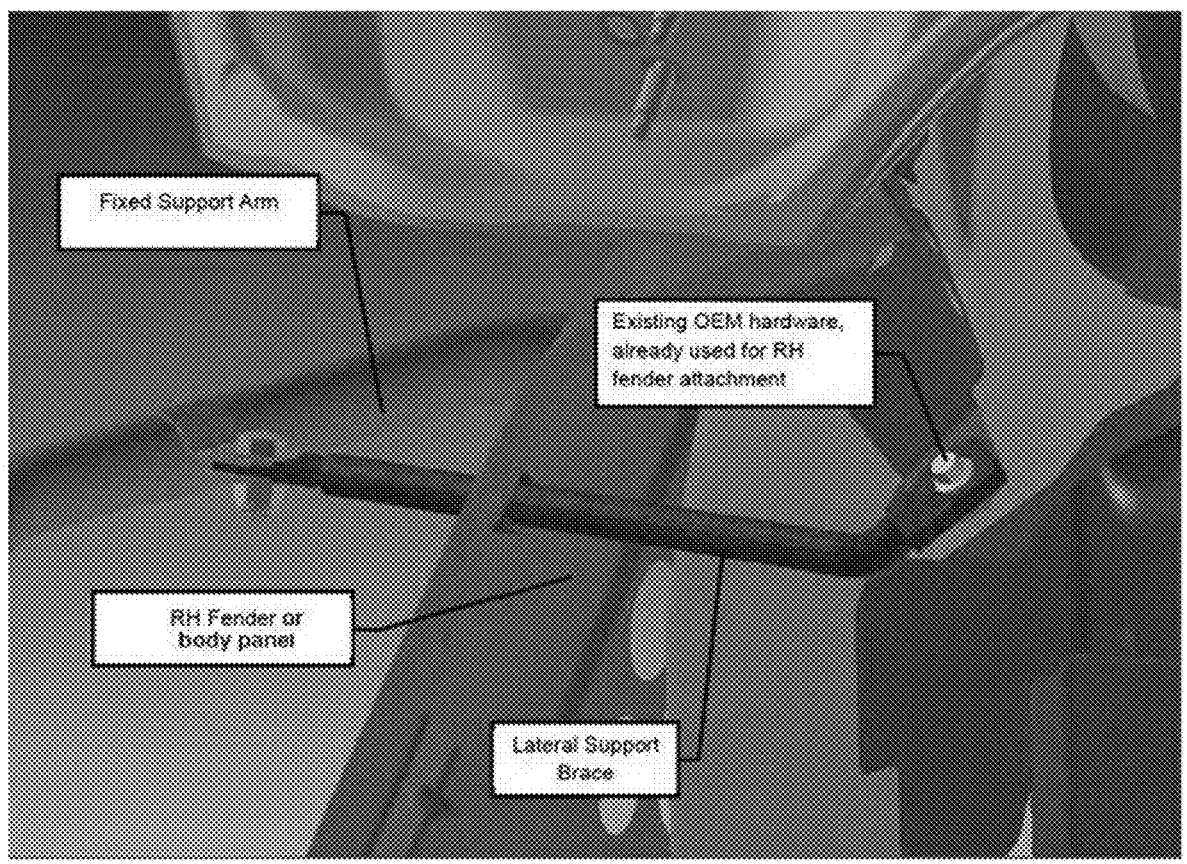
FIG. 8 is a diagram illustrating an upper support member and a lateral support brace according to some embodiments of the present invention.

FIG. 2 illustrates various views of a first portion of a mirror mounting assembly, including a lower support member and/or arm (hereinafter "support member," "arm," and/ or any combination thereof), an upper support member and/or arm, and an optional strut and/or support, according to some embodiments of the present invention. Table 2 lists the exemplary parts labeled in FIG. 2. In some embodiments, the lower support member and the upper support member together form what may be referred to herein as the fixed support arm, which attaches to the vehicle at upper and lower proximal ends, as shown in FIGS. 7 and 8.

TABLE 2

| Item | Quantity | Description |
|------|----------|-------------|
| 1 | 1 | BENT PLATE |
| 2 | 1 | STRAIGHT EDGE FLAT PLATE |
| 3 | 1 | STRUT/SUPPORT |
| 4 | 1 | UPPER FLAT END UPPER ARM |
| 5 | 1 | LOWER FLAT END LOWER ARM |

In some embodiments, the mirror mounting arm may comprise an inverse "F"-like shape, or other suitable shape/configuration. The two branches of the "F" may optionally include a strut between them for additional support. In some embodiments, the mirror mounting arm may be attached to the fixed support arm (upper and lower distal ends) via a hinge-type conjoining mechanism and/or other breakaway mechanism as shown, for example, in FIGS. 1, 3, and 4 and as described in further detail below. The mirror mounting arm may be movable about the hinge and may also be referred to herein as the pivot arm.

FIGS. 3-8 illustrate a mirror mounting assembly according to some embodiments of the present invention. Some of the drawings illustrate sectional compositions and/or partial sectional compositions of some embodiments of the present invention.

Figure 3:
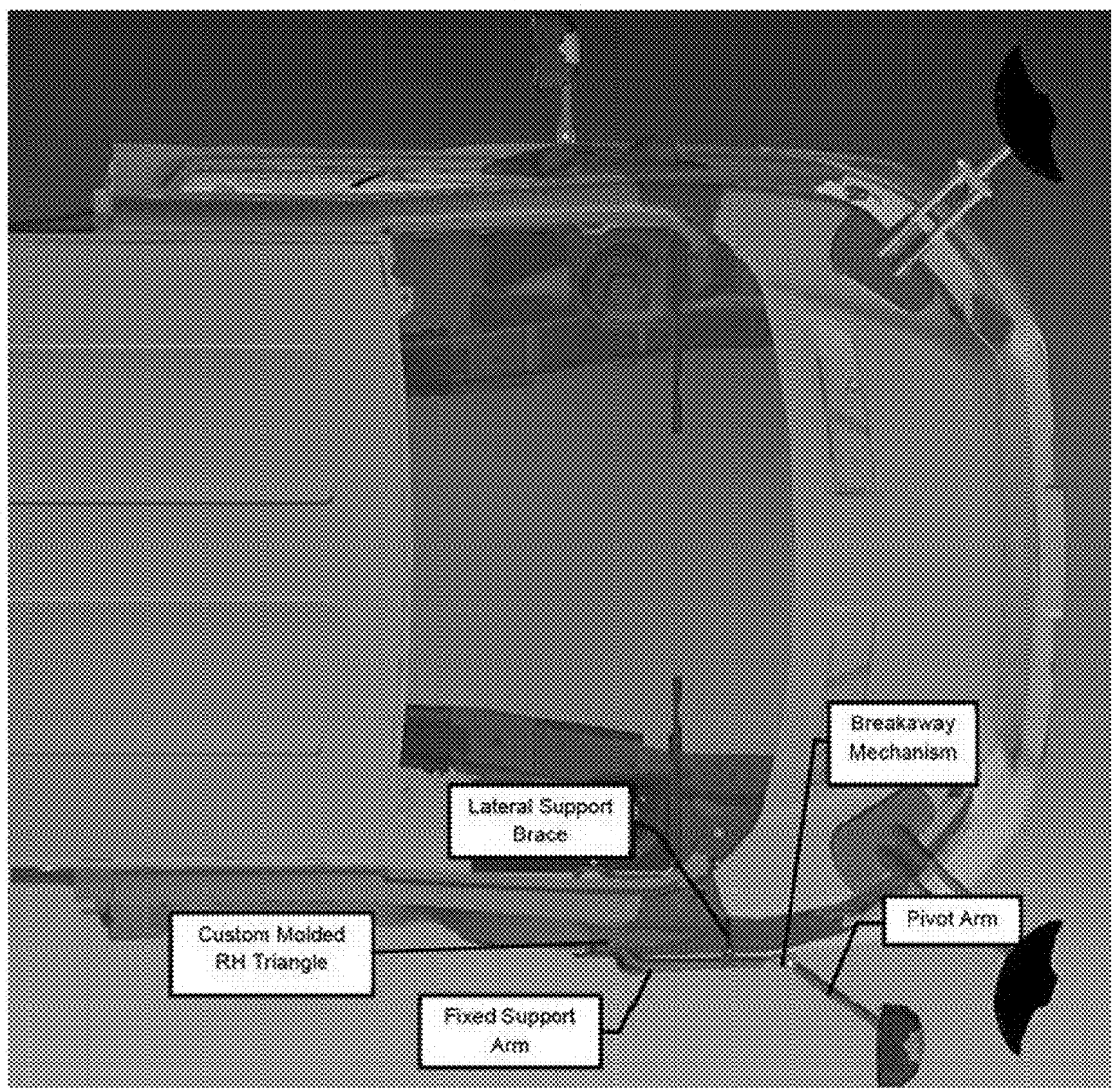
FIG. 3 is a diagram illustrating a mirror mounting assembly according to some embodiments of the present invention.
Figure 4:
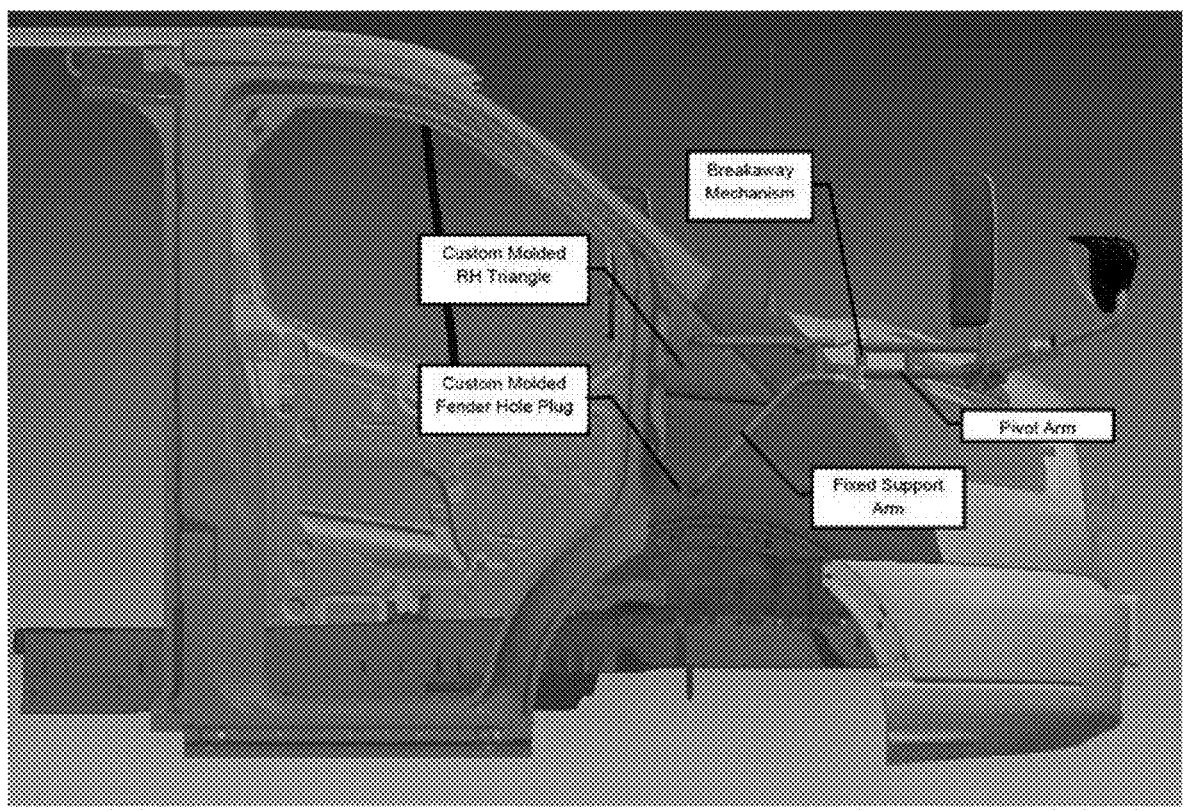
FIG. 4 is a diagram illustrating a mirror mounting assembly according to some embodiments of the present invention.

FIGS. 3-4 illustrate top and side views, respectively, of a mirror mounting assembly according to some embodiments of the present invention as attached to the right hand (RH) side of a vehicle including a side body panel and a front side portion of an engine block support structure. The other elements of the vehicle are not shown in FIGS. 3-4.

Figure 5:
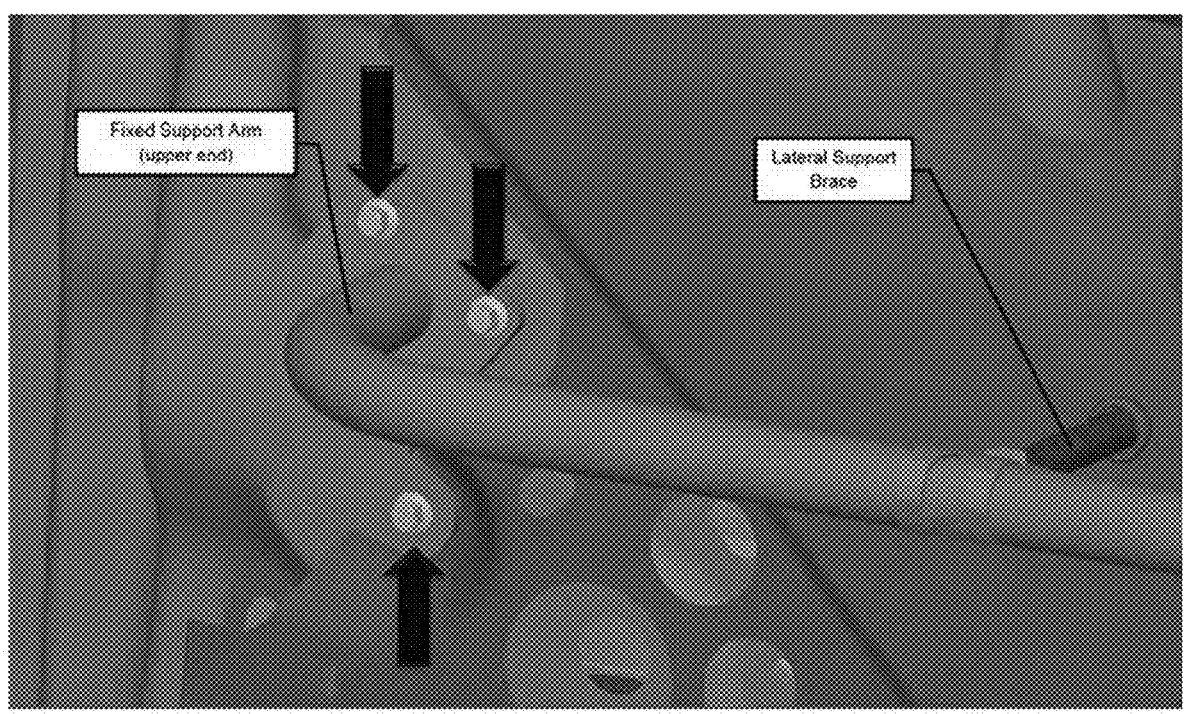
FIG. 5 is a diagram illustrating an upper support member and a lateral support brace according to some embodiments of the present invention.
Figure 6:
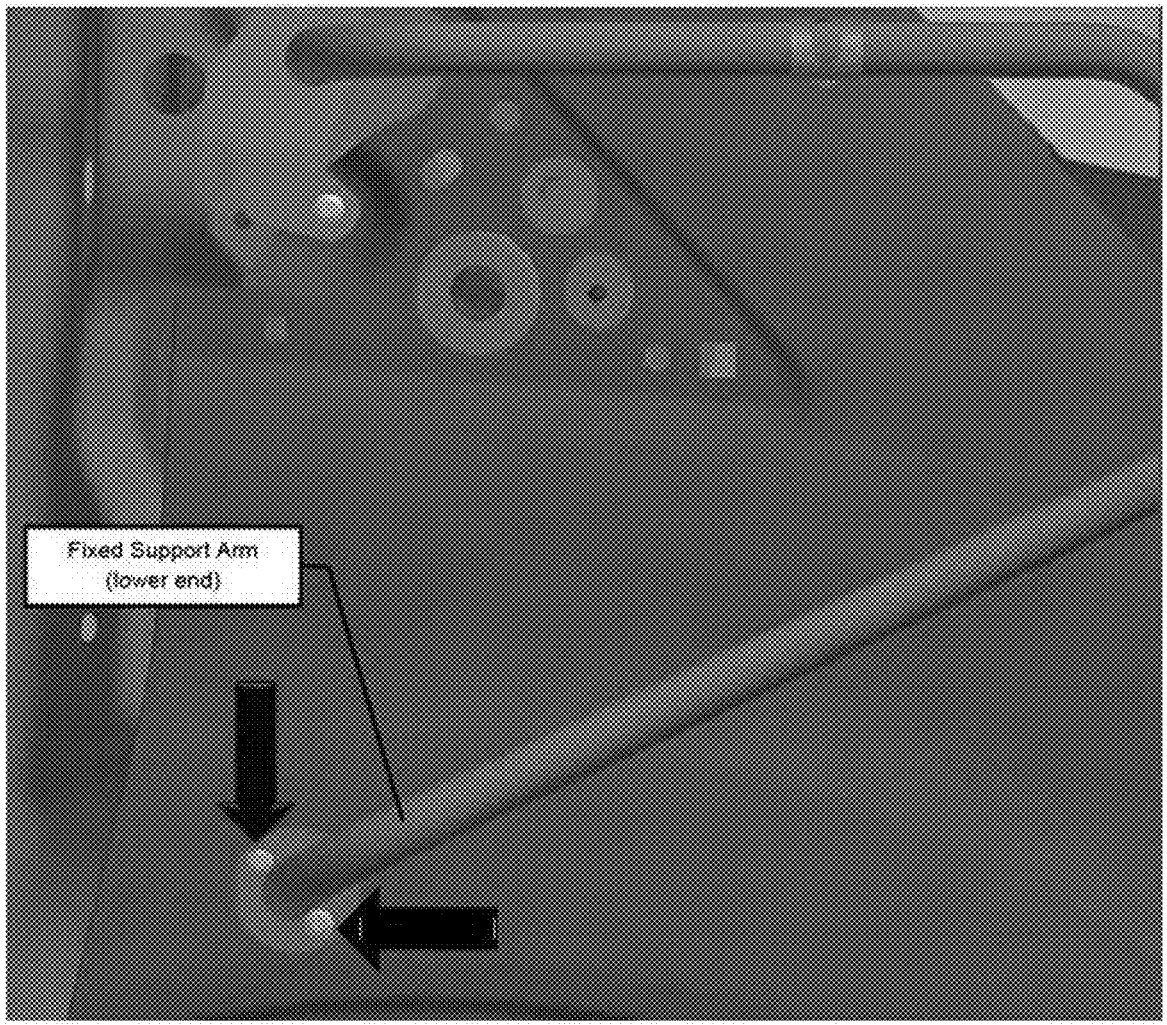
FIG. 6 is a diagram illustrating an upper support member and a lower support member according to some embodiments of the present invention.

FIG. 5 illustrates a mirror mounting assembly including an upper support member and a lateral support brace according to some embodiments of the present invention. Additionally, FIG. 5 illustrates some elements of a vehicle including a side body panel and side door upper hinge attachment holes. FIG. 6 illustrates some elements of a mirror mounting assembly including an upper support member and a lower support member according to some embodiments of the present invention. Additionally, FIG. 6 illustrates some elements of a vehicle including a side body panel, side door upper hinge attachment holes and side door lower hinge attachment holes. The other elements of mirror mounting assembly and the vehicle are not shown in FIGS. 5-6.

FIGS. 7-8 illustrate elements of a mirror mounting assembly including an upper support member and a lateral support brace according to some embodiments of the present invention. FIG. 8 is a detailed view of the box highlighted in FIG. 7, showing the lateral support brace fitted through a hole in the right hand fender or body panel, and connected at one end to the upper support member and at the other end to the vehicle (e.g., using existing OEM hardware already used for the right hand fender or body panel attachment). Additionally, FIGS. 7-8 illustrate some elements of a vehicle including a side body panel, a front side portion of an engine block support structure and a side body panel attachment hole. Other elements of the vehicle are not shown in FIGS. 7-8.

As shown in FIGS. 3-8, the chassis, interior body panel support structure and/or front side portion of the engine block support structure is located on the area to be covered by the side fender and/or side body panel when assembled. As shown for example in FIGS. 5, 6, the front side portion of the engine block support structure and the side body panel have side door upper hinge attachment holes and side door lower hinge attachment holes. As shown for example in FIGS. 7, 8, the front side portion of the engine block support structure and the side body panel each have a side body panel attachment hole. In some embodiments, before the mirror mounting assembly is attached to the vehicle, the side door upper hinge attachment holes are configured to be used for attaching a side door upper hinge member to the engine block support structure or other structural location by means of, for example, screws, and the side door lower hinge attachment holes are configured to be used for attaching a side door lower hinge member to the engine block support structure or other structural location support by means of, for example, screws. The side body panel attachment hole is configured to be used for attaching the side body panel to the engine block support structure or other structural location by means of, for example, a screw. Other standard connection devices can be used instead of and/or in addition to the screws, including bolts, welds, clamps, adhesives and the like.

In some embodiments, as shown in FIGS. 3-8, the mirror mounting assembly is configured to be mounted on the passenger side of the vehicle. In some embodiments, the mirror mounting assembly is configured to be mounted on the front side portion of the engine block support structure or other structural location, and the mirror mounting assembly is connected to the front side portion through holes provided on the side body panel.

Additionally and/or alternatively, the mirror mounting assembly may be mounted on other portions of the vehicle including, but not limited to, the driver's side of the vehicle, the back side (rear) of the vehicle, a different part of the body panel, or any other portion of the vehicle that may be advantageous to the desired mirror application using a variety of mounting options, such as screws, glue, mounting tape, straps, elastic straps, and the like. The mirror mounting assembly may optionally be mounted on various types of vehicles including but not limited to commercial, industrial, or passenger vehicles. In some embodiments of the mirror mounting assembly, the base end portions of the upper support member, lower support member and/or lateral brace support are connected through a portion of the body panel, chassis and/or the engine block support structure or other structural location through one or more openings provided on a side of the vehicle for direct connection to/through the body panel, the chassis and/or the engine block support structure or other structural location, and/or for connection to a different portion of the vehicle that provides support and/or reduced vibration on the assembly and/or the mirror. In some embodiments, the lateral support brace is connected to a portion of the body panel capable of providing stability, such as a reinforced area, folded area or frame area of the body panel and/or a structural location of the vehicle, for example, by using a mounting bracket such as one of the embodiments disclosed in U.S. Pat. No. 8,333,479, incorporated herein by reference in its entirety. In some embodiments, the mirror mounting assembly includes more than one lateral support brace. For example, where one lateral support brace provides structural support for the mirror mounting assembly through a connection point to a structural location optionally through the body panel, one or more additional lateral support braces may provide stabilization and connect to the vehicle at a structural location, for example, by routing the brace around or through the hood of the vehicle and/or between the hood and around the body panel under a level of the hood for connection to a portion of the vehicle, such as the interior of the body panel and/or engine support and/or a structural portion, as illustrated for example in FIGS. 4 and/or 7 of U.S. Pat. No. 8,333,479, incorporated herein by reference in its entirety. These secondary lateral support braces may, but need not, attach to the mirror mounting assembly in a similar fashion to the primary lateral support, for example, via bolts, welds, clamps, adhesives and the like, or some combination thereof.

Figure 9:
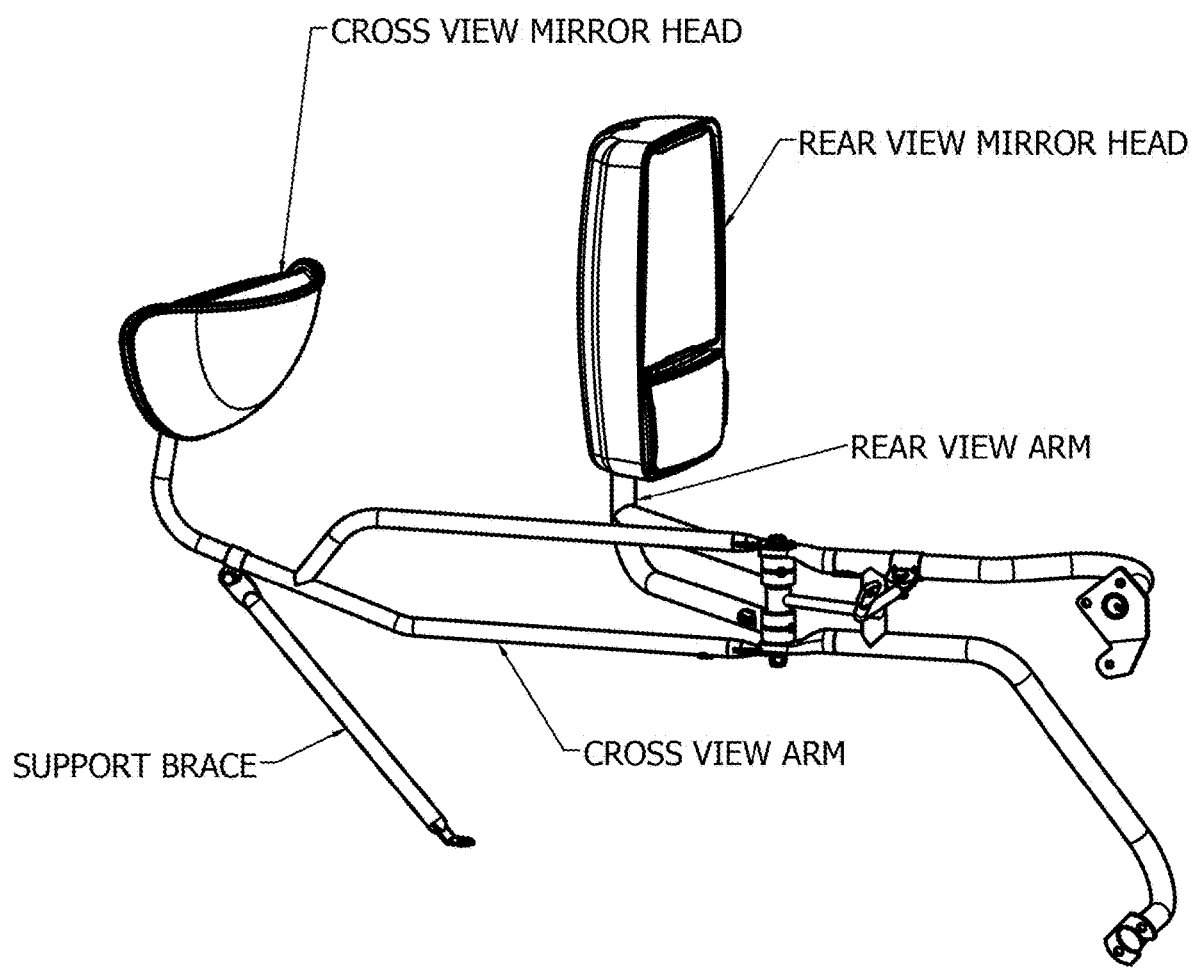
FIG. 9 is a diagram illustrating a mirror mounting assembly including a cross view mirror mounting arm with support brace and a rear view mirror mounting arm according to some embodiments of the present invention.
Figure 10:
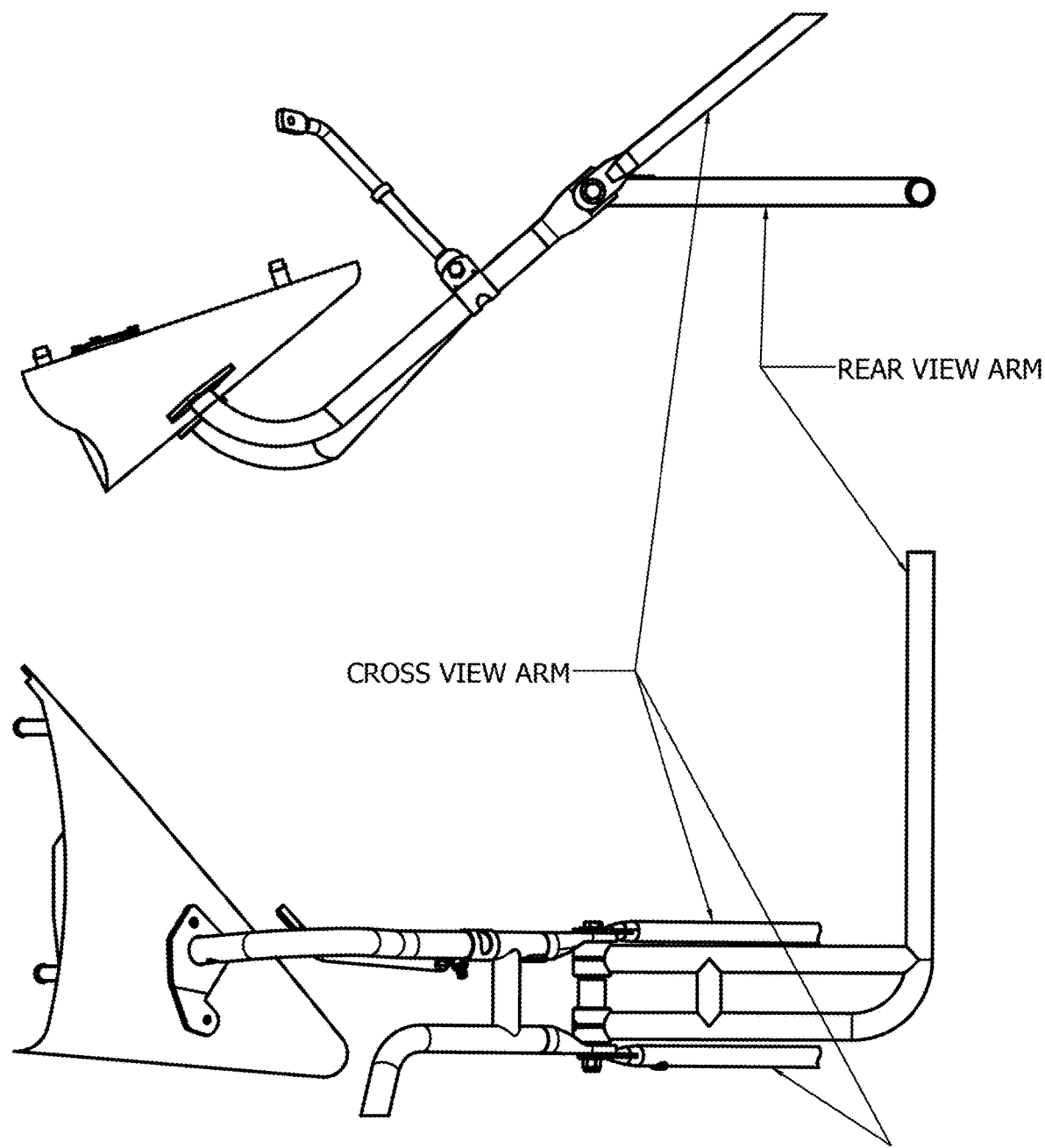
FIG. 10 is a diagram illustrating top and perspective views of a mirror mounting assembly including a cross view mirror mounting arm with support brace and a rear view mirror mounting arm according to some embodiments of the present invention.

In some embodiments, as illustrated in FIGS. 3-8, the mirror mounting assembly supports a rear view mirror. In other embodiments, the mirror mounting assembly supports a cross view mirror, either alone or in combination with a rear view mirror. For example, FIGS. 9 and 10 illustrate an embodiment where a cross view mirror and rear view mirror are mounted to the vehicle using a single mounting assembly. In this embodiment, the mirror mounting assembly includes a rear view mirror mounting arm and a cross view mirror mounting arm. Additionally, the cross view mirror mounting arm has an optional support brace connected to a portion of the body panel, chassis and/or the engine block support structure or other structural location through an opening provided on a side or a front of the vehicle for direct connection to/through the body panel, the chassis and/or the engine block support structure or other structural location, and/or for connection to a different portion of the vehicle that provides support and/or reduced vibration on the assembly and/or the mirror. The shorter the cross view mirror mounting arm, the less structural support and/or bracing will be needed. Various embodiments of the mirror mounting assembly may be used to mount one or more mirrors on the passenger side of the vehicle such as those embodiments illustrated in FIGS. 9 and 10, while other embodiments may be used to mount one or more mirrors on the driver side of a vehicle.

In some embodiments such as those illustrated in FIGS. 9 and 10, a rear view mirror mounting arm and a cross view mirror mounting arm are connected to a single conjoining mechanism, such as a support bracket and/or a hinge or pivot mechanism. In other embodiments, each mirror mounting arm is connected to a separate conjoining mechanism. In the embodiments, the mirror mounting assembly includes a cross view pivot mechanism for a cross view mirror mounting arm and a rear view pivot mechanism for a rear view mirror mounting arm. The cross view mirror pivot mechanism is advantageously positioned closer to the front of the vehicle than the rear view mirror pivot mechanism so the cross view mirror mounting arm can be shorter and thus not require bracing. Multiple-pivot or multiple-conjoining mechanism mirror mounting assemblies are contemplated on the passenger side of the vehicle as well; however, the relative locations of the pivots may be modified based on viewing constraints. For example, the driver side rear view mirror might be viewed through a door window, while the passenger side rear view mirror might be viewed through the windshield. As shown, in some embodiments, one or more struts or supports may optionally be provided between the upper and lower support members for additional support. Either or both of the struts may further include a horizontal support connecting one or more of the struts to a pivot mechanism.

One example of a mirror mounting assembly has a cross view conjoining mechanism, support bracket and/or pivot mechanism. In this embodiment, each conjoining mechanism is a pivot assembly. Each pivot assembly connects a mirror mounting arm to at least one support member. Each mirror mounting arm includes a mounted end, an arm portion and a mirror attachment. Each mounted end includes, for example, one or two round tubes or supports, and each tube/support includes two holes or receiving portions. The four holes (two for each tube when two tubes are used) are axially aligned and configured to receive a screw, bolt, rod or the like. Each pivot assembly includes two pairs of clamps, one pair for each of the corresponding mirror mounting arm's tubes, and each pair of clamps assembles to form a receiving section that receives a round tube from a mirror mounting arm. In some embodiments, the assembled clamps additionally form access hole 100 through which cables in heated and motorized mirror assemblies may be passed. For each pivot assembly, a support member can include, for example, three protruding members or tabs: two flat tube ends and a spacer, all spaced apart from one another and all with axially aligned holes configured to receive the same screw, bolt, rod or the like. Each assembled clamp pair and tube combination is sandwiched between washers, and each assembled tube, clamp and washer sandwich is sandwiched between the spacer and a flat tube end. In this sandwiched state, all the holes are aligned, and the screw, bolt, rod or the like is inserted through all the holes and capped with a nut on a threaded end, a rivet, a weld or the like. Each assembled pivot assembly permits the corresponding mirror mounting arm to pivot freely along the axis of the screw, bolt, rod or the like, while maintaining a connection with the one or more support members. In some embodiments, each pair of clamps additionally forms access hole 100, through which cables in heated and motorized mirror assemblies may be passed. In some embodiments, different types of pivot mechanisms can optionally be used.

As shown in FIGS. 1-2, in some embodiments the mirror mounting assembly comprises a lower support member, an upper support member, a lateral support brace and a mirror mounting arm. The upper support member, the lower support member and the lateral support brace each include a base end portion and a distal end portion. The upper and lower support members are optionally tubular. The base end portions of the upper support member, the lower support member and the lateral brace are configured to be connected to the vehicle. The distal end portions of the upper support member and the lower support member are attached to the mirror mounting arm. The distal end portion of the lateral support brace is configured to be connected and substantially perpendicular to the upper support member and/or the lower support member, providing increased structural support for the mirror mounting assembly. For example, the lateral support brace may form a 90°±10° angle with the at least one of the upper support member or the lower support member. The mirror mounting arm has a mounted end, an arm portion and a mirror attachment end. The mounted end is configured to be connected to the lower and upper support members at a first and second mount location. The mirror attachment end is configured to hold a mirror. In some embodiments, the angle formed between the lateral support brace and the upper and/or lower support members can be of any angle that provides support thereto.

Optionally, the mirror mounting arm includes a breakaway mechanism. The breakaway mechanism is configured to securely hold the mirror mounting arm portion of the mirror mounting assembly, which can break away without detaching the entire mirror mounting assembly from the vehicle body. The breakaway mechanism may, but need not, utilize a detent mechanism. An example of a breakaway mechanism without detent is friction based. A nut/bolt combination compresses all visible bushings, and the resulting friction between contact surfaces keeps the pivoting arm portion stable until the friction is defeated by external factors such as an arm collision, an operator moving it away or the like. An additional example of a breakaway mechanism is described in U.S. Pat. No. 6,796,667, entitled "Breakaway Bus Mount System To Hold Mirror Supporting Shaft," which is incorporated herein by reference in its entirety.

In some embodiments, the breakaway mechanism is configured to be connected to the upper support member at a first mount location and the lower support member at a second mount location. The arm portion of the mirror mounting arm is hingedly connected to the breakaway mechanism.

In some embodiments, as shown in FIGS. 1-2, the mirror mounting assembly includes a strut. The upper support member and the lower support member are optionally connected to each other with the strut, which provides increased structural support for the mirror mounting assembly.

The mirror mounting assembly is generally attached to the left or right side of a vehicle so that the driver can see toward the rear of the vehicle. Additionally, the mirror mounting assembly may be attached to the vehicle in three locations to form a three point structural connection. Optionally, the three point structural connection forms a tripod configuration. In other embodiments, two or more attachments to the vehicle are used.

In some embodiments, the mirror mounting assembly supports a cross view mirror, either alone or in combination with a rear view mirror, and mounted to the right side or the left side of the vehicle. The cross view mirror is generally attached to the side of the vehicle so the driver can see across the front or the hood of the vehicle, reducing any blind spots that may be created by an A-pillar, hood, roof support structure and/or other obstruction. In one such embodiment, a rear view mirror mounting arm supports a rear view mirror, a cross view mirror mounting arm supports a cross view mirror, and both mirrors are mounted to the vehicle using the same mounting assembly. The mirror mounting arms each have a mounted end, an arm portion and a mirror attachment end. The mounted ends are configured to be connected to the lower and upper support members at a first and second mount location. In some embodiments, the mounted ends of the mirror mounting arms are configured to be connected at the same mounting locations on the support members. In other embodiments, the mounted ends of the mirror mounting arms are configured to be connected to the support members at different mounting location. The mirror attachment ends of the mirror mounting arms are configured to hold a mirror.

In certain embodiments, the mounted ends of the mirror mounting arms are directly connected to one or more support members. In other embodiments, the mounted ends are connected using a conjoining mechanism, such as a hinge or pivot mechanism. In some embodiments, the mounted ends of the mirror mounting arms are hingedly connected to a breakaway mechanism, which is configured to be connected to the upper support member at a first mount location and the lower support member at a second mount location.

In some embodiments, the cross view mirror mounting arm is supported by a cross view mirror support brace. The angle formed between the cross view mirror support brace and the arm portion of the cross view mirror mounting arm can be of any angle that provides support thereto.

As shown in FIGS. 3-8, in some embodiments, the base end portions of the upper support arm, the lower support member and the lateral support brace are connected to the vehicle, for example, to the front side portion of the vehicle chassis, an engine block support structure or other structural location, through holes in a side body panel, permanently welded or attached via standard connections that may be permanent or temporary. In certain embodiments, the three attachment locations are arranged in a tripod configuration. Optionally, as shown in FIGS. 1, 3-4, the base end portion of the upper support member is covered by an upper mounting arm mount cover and/or cover assembly (labeled in FIGS. 3 and 4 as "Custom Molded RH Triangle"). Optionally, as shown in FIGS. 1, 4, the base end portion of the lower support member is covered with a plug (labeled in FIG. 4 as "Custom Molded Fender Hole Plug"). The cover and/or the plug may comprise parts that were preinstalled on the vehicle, or they may be provided as part of the mirror mounting assembly.

In some embodiments, the attachment locations leverage and/or utilize existing holes in the side body panel and/or the front side portion of the vehicle chassis, the engine block support structure and/or other structural location to avoid drilling additional holes. For example, a side door of a vehicle may have upper and lower hinge members that attach to the chassis, engine block support structure and/or other structural location with hinge attachment holes and mounting fasters. In some embodiments, as shown in FIGS. 5, 6, the upper support member is connected to the front side portion of the chassis, engine block support structure and/or other structural location using one or more side door upper hinge mounting fasteners and attachment holes. In some embodiments as shown in FIGS. 4, 6, the lower support member is connected to the front side portion of the chassis, engine block support structure and/or other structural location using one or more side door lower hinge mounting fasteners and attachment holes. Additionally, the side body panel may attach to the front side portion of the chassis, engine block support structure and/or other structural location with one or more side body panel attachment holes and mounting fasters. In some embodiments as shown in FIGS. 7, 8, the lateral support brace is connected to the front side portion of the chassis, engine block support structure and/or other structural location using one or more side body panel mounting fasteners and attachment holes.

In some embodiments, the upper and lower support members project from the side body panel at their attachment locations and are configured to extend along a side body panel of the vehicle substantially in conformance with the vehicle. This may be accomplished, for example, with a bend, joint, angle, arc, curve or otherwise. In some embodiments, the upper and lower support members run substantially parallel to the body panel of the vehicle. For example, the upper and lower support members may form an angle of 10° with the side body panel of the vehicle. The angle may be varied depending on the positioning and/or attachments of the lower and upper support members and/or the lateral support brace. The farther forward the upper and lower support members extend towards the front of the vehicle, the closer to the vehicle they can be while maintaining the same unobstructed field of view.

In some embodiments, threaded holes may be created on the portions of the chassis other than the portions on which the threaded holes are created for attaching the door hinge members, support members and/or lateral brace to the chassis or other areas of the vehicle that provide, for example, a location of reduced vibration on the mirror arm and/or mirror head. In some embodiments, the passenger side door is attached to the vehicle so that the upper hinge member is pivotably supported by the upper side door hinge member, and the lower hinge member is pivotably supported by the lower side door hinge member. In some embodiments, instead of threaded holes in the chassis or other area of the vehicle, protruding connection screws, threaded bolts and the like may be used. In some embodiments, other standard permanent or temporary connection techniques and/or devices may be used, including for example, bolts, screws, welds, clamps and/or adhesives.

Figure 11:
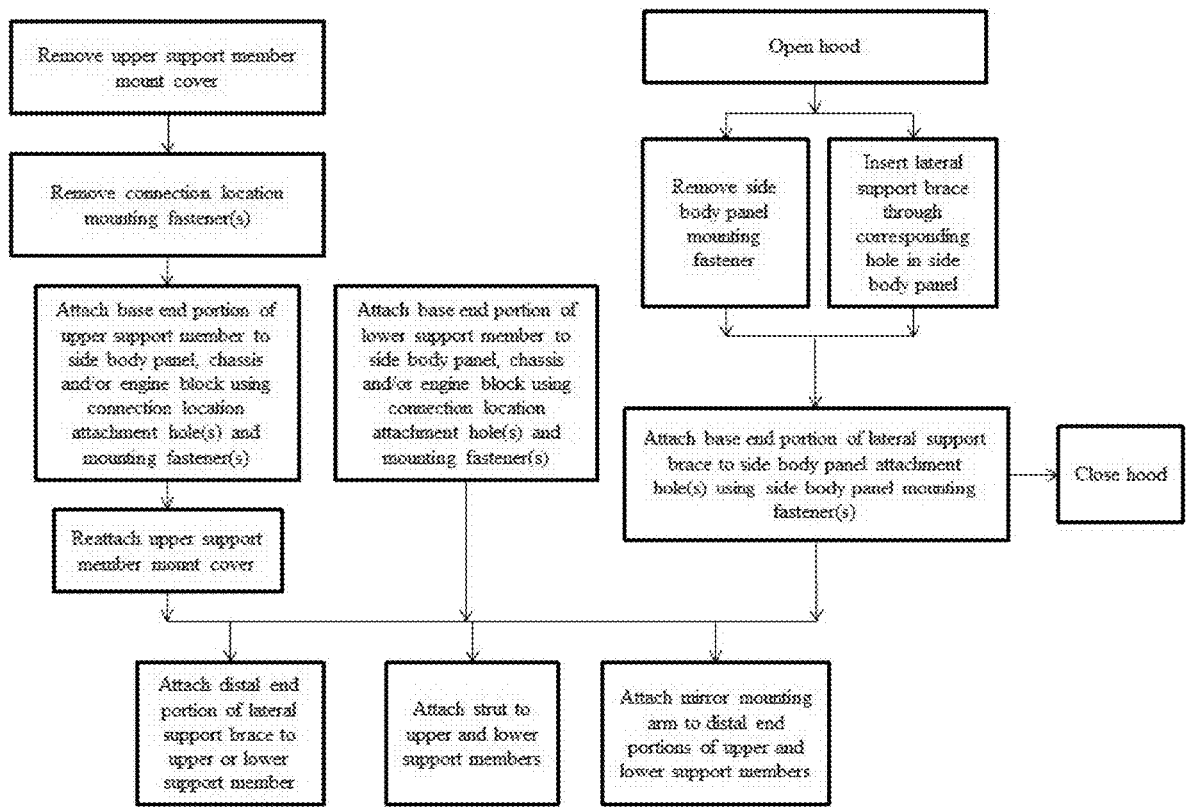
FIG. 11 is a flow chart illustrating a method of installing a mirror mounting assembly according to some embodiments of the present invention.
Figure 12:
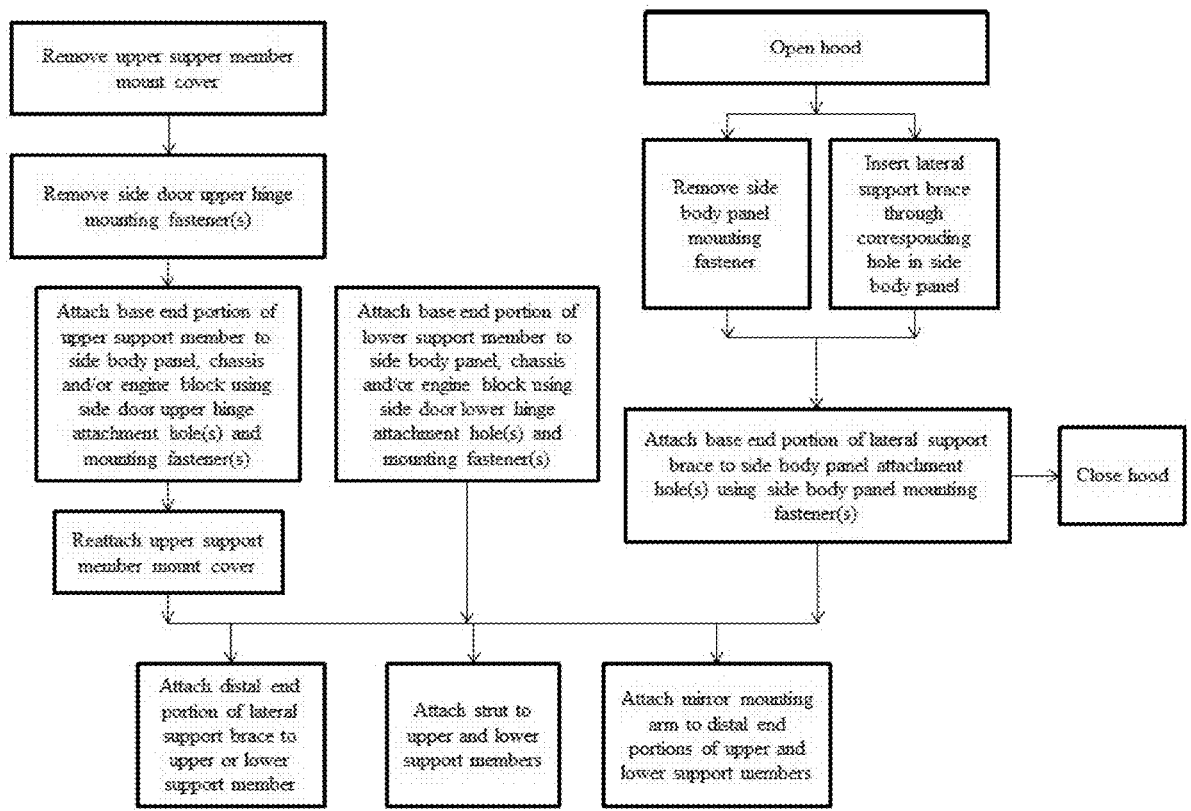
FIG. 12 is a flow chart illustrating a method of installing a mirror mounting assembly according to some embodiments of the present invention.

FIGS. 11 and 12 are flow charts depicting methods for installing the mirror mounting assembly to the vehicle according to some embodiments of the present invention. For example, an otherwise fully constructed vehicle may be subsequently adapted or upgraded to include one or more mirror mounting assemblies, including using preexisting mounting fasteners such as door hinge mounting fasteners. Where the mirror mounting assembly includes upper and lower support members and the base portion of the upper support member is to be covered with a cover in some embodiments, the cover may come preinstalled on the vehicle. Accordingly, a method of installation may include first removing the cover and then removing the preexisting mounting fasteners such as upper and lower side door hinge mounting fasteners. The base end portions of the upper and lower support members may then be connected to the side body panel by means of, for example, the preexisting mounting fasteners.

Alternatively, the upper and lower support members may be connected to the chassis, the engine block and/or other support structure through holes in the side body panel, in which case, the side body panel holes must first be prepared, either while the side body panel is still attached to the vehicle or by first removing the side body panel. Then at least one of the base end portions of the one or more support members is attached to the chassis or other area of the vehicle so that, for example, an upper support member is fixed to threaded holes or receptors of the chassis through one or more of the holes in the side body panel by means of screws or other connection devices. A lower support member is fixed to the threaded holes or receptors of the chassis through one or more of the holes in the side body panel by means of screws or other connection devices. In some embodiments, the side body panel is fixed to the chassis using a threaded hole that may be used to fix both of the side body panel and the upper support member of the mirror mounting assembly.

The reattachment of the side body panel may be performed in conjunction with, or separately from, the attachment of the support members. After the support members are attached to the vehicle, and the side body panel reattached, if necessary, the optional mount cover may be reinstalled and/or one or more mounting plugs may be used to cover the mounting locations. The method may additionally include attaching a strut to the upper and lower support members.

A lateral support brace may also connect through the side body panel to the engine block or other structural location using a preexisting connection point, such as the location where a side body panel attaches to the vehicle using a side body panel mounting fastener. Accordingly, a method according to some embodiments includes first opening the hood of the vehicle, then removing the preexisting side body panel mounting fastener and inserting the lateral support brace through a corresponding hole in the side body panel. This hole may need to be machined before or after the side body panel is removed, which may be done while machining the holes for the upper and lower support members. The base end portion of the lateral support brace is attached to the location where the side body panel attaches using the side body panel mounting faster, and the hood is closed. The lateral support brace is then attached to the upper and/or lower support members. In some embodiments, the lateral support brace connects to the vehicle at a structural location without traveling through the side body panel, obviating the need to machine a hole in the side body panel. Additionally and/or alternatively, additional lateral support braces may connect to additional locations of the vehicle, for example, by routing one or more additional lateral support braces through or around the hood to a vehicle location under the hood and/or between the hood and around the body panel for connection to a portion of the vehicle below the level of the hood, such as the interior of the body panel and/or engine support and/or a structural portion, as illustrated for example in FIGS. 4 and/or 7 of U.S. Pat. No. 8,333,479, incorporated herein by reference in its entirety.

One or more mirror mounting arms configured to carry a mirror each may be connected directly to the support members or to a separate conjoining mechanism, such as a hinge mechanism, pivot mechanism and/or breakaway mechanism, optionally integrated into the one or more support members. In some embodiments, a method for installing the mirror mounting assembly includes connecting at least one mirror mounting arm, including a mirror, to the one or more support members. In some embodiments, multiple mirror mounting arms are connected to the assembly at a single conjoining mechanism. In other embodiments, the multiple mirror mounting arms are connected to the assembly at separate conjoining mechanism.

In some embodiments, a method for installing the mirror mounting assembly to the vehicle includes connecting a first mirror, such as a rear view mirror, to a first mirror mounting arm, connecting the first mirror mounting arm to a support member. In some embodiments, the method for installing the mirror mounting assembly additionally includes connecting a second mirror, such as a cross view mirror, to a second mirror mounting arm, and connecting the second mirror mounting arm to the support member. The method also includes connecting the support member to a first vehicle location at a portion of a chassis of the vehicle on which a door hinge member is configured to be placed, and connecting a lateral support brace including a base end portion to the vehicle at a second vehicle location and a distal end portion to said support member. In some embodiments, the method additionally includes connecting a second support brace including a base end portion to the vehicle at a third vehicle location and a distal end portion to the second mirror mounting arm.

In some embodiments, the mirror mounting assembly comprises a triangular mounting plate. The triangle mount may comprise, for example, an aluminum casting, hardened plastic and/or other suitable material. In various embodiments, aluminum alloy(s) or other metals may be used. As illustrated, the triangle mount comprises a mirror attachment portion on its outer face for attaching a mirror mounting arm thereto. The mirror attachment portion may comprise, for example, a conjoining mechanism, such as a support bracket and/or a hinge or pivot mechanism integral therewith, formed therein, or attached to a base area of the triangle mount. In some embodiments, the mirror attachment portion may be connected to the mounting plate, for example, by welding, screws, glue, or other connection mechanism. In other embodiments, the mirror attachment portion may be integrally formed with the mounting plate, for example, by casting the triangle mount as one piece. The triangle mount casting can be configured to allow the installation of a breakaway mechanism as described above, for example, a breakaway with detent (Spring-break) mechanism.

Screw holes may be provided in the triangle mount for attaching the mount to the vehicle. In some embodiments, reinforcement (e.g., stiffening ribs) may be provided in the metal around and/or between the screw holes for additional strength and structural support, near the apertures in, for example, a crisscross pattern. One or more additional holes, such as a cable access hole, may also be provided. The triangle mount may be configured for use on the left hand or the right hand side of the vehicle.

A tubular mirror mounting arm comprising, for example, an inverse "F"-type shape or other shape may be attached to a mirror attachment portion comprising a hinge loop on the triangle mount, for example, via a bolt and nut, forming a pivot mechanism. The nut and/or bolt may have a cover/cap for protection, for example, from corrosion. A mirror, such as a rear view mirror, may be attached to the distal end of the mirror mounting arm. Other overall arm shapes, tube dimensions and/or shapes, and/or lengths for the different segments of the mirror mounting arm may be used in other embodiments. In some embodiments, the different segments may be connected to each other using a weld connection and/or other connection mechanism such as screws, bolts, adhesive, and any combination thereof. In alternative embodiments, the different segments of the mirror mounting arm may form an integral member.

The mirror mounting assembly comprising the triangle mount may be bolted, for example, via three screws, to existing upper door hinge mounting holes, as indicated by the three arrows. An additional arrow indicates an optional cable access hole from the mirror mounting assembly into the vehicle.

In some embodiments, the mirror mounting assembly comprises a triangular mounting plate. The triangle mount may comprise, for example, an aluminum casting, hardened plastic and/or other suitable material. In various embodiments, aluminum alloy(s) or other metals may be used. As illustrated, the triangle mount comprises a mirror attachment portion on its outer face for attaching a mirror mounting arm thereto. The mirror attachment portion may comprise, for example, a conjoining mechanism, such as a support bracket and/or a hinge or pivot mechanism integral therewith, formed therein, or attached to a base area of the triangle mount. In some embodiments, the mirror attachment portion may be connected to the mounting plate, for example, by welding, screws, glue, or other connection mechanism. In other embodiments, the mirror attachment portion may be integrally formed with the mounting plate, for example, by casting the triangle mount as one piece. The triangle mount casting can be configured to allow the installation of a breakaway mechanism as described above, for example, a breakaway with detent (Spring-break) mechanism.

Screw holes may be provided in the triangle mount for attaching the mount to the vehicle. In some embodiments, reinforcement (e.g., stiffening ribs) may be provided in the metal around and/or between the screw holes for additional strength and structural support, near the apertures in, for example, a crisscross pattern. One or more additional holes, such as a cable access hole, may also be provided. The triangle mount may be configured for use on the left hand or the right hand side of the vehicle.

A tubular mirror mounting arm comprising, for example, an inverse "F"-type shape or other shape may be attached to a mirror attachment portion comprising a hinge loop on the triangle mount, for example, via a bolt and nut, forming a pivot mechanism. The nut and/or bolt may have a cover/cap for protection, for example, from corrosion. A mirror, such as a rear view mirror, may be attached to the distal end of the mirror mounting arm. Other overall arm shapes, tube dimensions and/or shapes, and/or lengths for the different segments of the mirror mounting arm may be used in other embodiments. In some embodiments, the different segments may be connected to each other using a weld connection and/or other connection mechanism such as screws, bolts, adhesive, and any combination thereof. In alternative embodiments, the different segments of the mirror mounting arm may form an integral member.

The mirror mounting assembly comprising the triangle mount may be bolted, for example, via three screws, to existing upper door hinge mounting holes, as indicated by the three arrows. An additional arrow indicates an optional cable access hole from the mirror mounting assembly into the vehicle.

In some embodiments, the triangle mount may be used in combination with a lateral support mounting assembly. For example, a mirror assembly mounted to the triangle mount may be attached to the lateral support brace, and/or the upper and/or lower support member.

For the purposes of illustrating certain aspects of the present invention, the preferred embodiments are described above and illustrated in the drawings. It should be understood, however, that the application is not limited to the precise arrangement, structures, features, embodiments, aspects, and devices shown, and the arrangements, structures, features, embodiments, aspects and devices shown may be used singularly or in combination with other arrangements, structures, features, embodiments, aspects and devices. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific apparatus described above may be altered so that certain parts are independent or combinable with other parts, to the extent that the parts are not dependent upon each other. Thus, the specific parts described herein are not to be considered implying specific parts to implement the above described apparatus. Other alterations or modifications of the above apparatus are also contemplated. For example, further insubstantial parts of the above are also considered within the scope of the apparatus described herein.

In addition, features illustrated or described as part of one embodiment can be used on other embodiments to yield a still further embodiment. Additionally, certain features may be interchanged with similar devices or features not mentioned yet which perform the same or similar functions. Further, while a specific sequence of process steps has been described, the sequence and/or order of steps can be modified in any suitable manner to achieve the results of the present invention. It is therefore intended that such modifications and variations are included within the totality of the present invention.

What is claimed is:

1. A mirror mounting assembly for mounting a mirror to a vehicle, comprising:
   a mirror mounting arm carrying the mirror;

a support member including a base end portion and a distal end portion, the base end portion configured to be connected to the vehicle at a first vehicle location comprising a portion of a chassis of the vehicle on which a door hinge member is configured to be placed;
a conjoining mechanism configured to be connected to the distal end portion of said support member and configured to be hingedly connected to the mirror mounting arm; and
a lateral support brace including a lateral base end portion configured to be connected to the vehicle at a second vehicle location and a lateral distal end portion configured to be connected to at least one of said support member, said conjoining mechanism and said mirror mounting arm.

2. The mirror mounting assembly of claim 1, wherein:
the distal end portion of the support member is configured to extend along a side body panel of the vehicle substantially in conformance and parallel with the side body panel.

3. The mirror mounting assembly of claim 1, wherein:
the lateral support brace and the support member form an angle of $90°±10°$.

4. The mirror mounting assembly of claim 1, wherein the mirror mounting arm including a breakaway mechanism configured to securely hold the mirror mounting arm.

5. The mirror mounting assembly of claim 4, wherein the breakaway mechanism is configured to be connected to an upper support member at a first mount location and a lower support member at a second mount location.

6. The mirror mounting assembly of claim 5, wherein the mirror mounting arm is hingedly connected to the breakaway mechanism.

7. The mirror mounting assembly of claim 1 further comprising a strut, wherein an upper support member and a lower support member are connected to each other with the strut.

8. A mirror mounting assembly for mounting a mirror to a vehicle, comprising:
a mirror mounting arm carrying the mirror;
a cross view mirror mounting arm configured to carry a cross view mirror,
a support member including a base end portion and a distal end portion, the base end portion configured to be connected to the vehicle at a first vehicle location comprising a portion of a chassis of the vehicle on which a door hinge member is configured to be placed, wherein the distal end portion of the support member is configured to extend along a side body panel of the vehicle substantially in conformance and parallel with the side body panel;
a conjoining mechanism configured to be connected to the distal end portion of said support member and configured to be connected to the mirror mounting arm, wherein said conjoining mechanism is configured to be connected to the mirror mounting arm and the cross view mirror mounting arm; and
a lateral support brace including a lateral base end portion configured to be connected to the vehicle at a second vehicle location and a lateral distal end portion configured to be connected to at least one of said support member, said conjoining mechanism and said mirror mounting arm.

9. The mirror mounting assembly of claim 8, wherein the lateral support brace and the support member form an angle of $90°±10°$.

10. A method of installing a mirror mounting assembly on a vehicle, comprising:
connecting a mirror to a mirror mounting arm;
connecting the mirror mounting arm to a conjoining mechanism;
connecting the conjoining mechanism to a support member, wherein the support member includes a base end portion and a distal end portion;
connecting the support member to a portion of a chassis of the vehicle on which a door hinge member is configured to be placed;
connecting a lateral support brace including a base end portion to the vehicle at a second vehicle location and a distal end portion to said support member;
connecting the base end portion of the support member to the portion of the chassis by means of threaded holes provided on the chassis that are configured to be used for attaching the door hinge member to the chassis;
connecting the distal end portion of the support member to the conjoining mechanism; and
connecting the base end portion of the support member to the portion of the chassis by means of threaded holes provided on the chassis that are configured to be used for attaching a side fender to the chassis.

11. A method of installing a mirror mounting assembly on a vehicle, comprising:
connecting a mirror to a mirror mounting arm;
connecting the mirror mounting arm to a conjoining mechanism;
connecting the conjoining mechanism to a support member, wherein the support member includes a base end portion and a distal end portion;
connecting the support member to a portion of a chassis of the vehicle on which a door hinge member is configured to be placed;
connecting a lateral support brace including a base end portion to the vehicle at a second vehicle location and a distal end portion to said support member;
connecting the base end portion of the support member to the portion of the chassis by means of threaded holes provided on the chassis that are configured to be used for attaching the door hinge member to the chassis;
connecting the distal end portion of the support member to the conjoining mechanism; and
connecting the base end portion of the support member to the portion of the chassis through an opening provided on a side fender of the vehicle.

12. A method of installing a mirror mounting assembly on a vehicle, comprising:
connecting a mirror to a mirror mounting arm;
connecting the mirror mounting arm to a conjoining mechanism, wherein the conjoining mechanism includes a support portion configured to be connected to a distal end portion of a support member and a mirror portion;
connecting the conjoining mechanism to the support member, wherein the support member includes a base end portion and the distal end portion,
connecting the support member to a portion of a chassis of the vehicle on which a door hinge member is configured to be placed;
connecting a lateral support brace including a base end portion to the vehicle at a second vehicle location and a distal end portion to said support member;
connecting the base end portion of the support member to the portion of the chassis by means of threaded holes provided on the chassis that are configured to be used for attaching the door hinge member to the chassis;

connecting the distal end portion of the support member to the conjoining mechanism; and connecting a cross view mirror mounting arm, including an arm portion and configured to carry a cross view mirror, to the mirror portion of the conjoining mechanism, wherein the mirror portion of the conjoining mechanism is configured to be connected to the mirror mounting arm and the cross view mirror mounting arm.

* * * * *